United States Patent [19]
Bailey et al.

[11] 3,849,332
[45] Nov. 19, 1974

[54] SEQUENTIAL CARBONIZATION AND ACTIVATION OF FIBROUS MATERIAL IN A CARBON DIOXIDE ATMOSPHERE

[75] Inventors: Alan Bailey; Frederick Arthur Pomroy Maggs, both of Salisbury; John Herbert Williams, Wilton, all of England

[73] Assignee: The Secretary of State for Defence in Her Britannic Majesty's Government of the United Kingdom of Great Britain and Northern Ireland, London, England

[22] Filed: Feb. 15, 1972

[21] Appl. No.: 226,481

Related U.S. Application Data

[63] Continuation-in-part of Ser. No. 1,561, Jan. 8, 1970, abandoned.

[30] Foreign Application Priority Data
Jan. 8, 1969 Great Britain...................... 1150/69

[52] U.S. Cl................ 252/422, 23/277 R, 106/307, 201/19, 201/25, 201/36, 252/421, 252/425, 252/445, 264/29, 423/447, 437/2
[51] Int. Cl............................................. C01b 31/08
[58] Field of Search........... 252/421, 422, 425, 445; 423/447; 201/25, 9, 20, 36, 41; 264/29

[56] References Cited
UNITED STATES PATENTS

| | | | |
|---|---|---|---|
| 2,342,862 | 2/1944 | Hemminger........................ | 252/421 |
| 3,011,981 | 12/1961 | Soltes................................ | 252/421 |
| 3,018,288 | 1/1962 | Tokime et al....................... | 252/421 |
| 3,053,775 | 9/1962 | Abbott............................... | 252/421 |
| 3,441,378 | 4/1969 | Didchenko......................... | 423/447 |
| 3,461,082 | 8/1969 | Otani et al.......................... | 252/421 |
| 3,479,151 | 11/1969 | Gutzeit.............................. | 423/447 |
| 3,529,934 | 9/1970 | Shindo............................... | 423/447 |
| 3,557,020 | 1/1971 | Shindo et al....................... | 252/422 |
| 3,639,266 | 1/1972 | Battista.............................. | 252/445 |

Primary Examiner—Daniel E. Wyman
Assistant Examiner—P. E. Konopka
Attorney, Agent, or Firm—Clelle W. Upchurch

[57] ABSTRACT

Highly-activated, strong, flexible, fibrous carbon is produced by upward passage of a fibrous organic starting material under critical conditions in a carbon dioxide-containing atmosphere through a vertical furnace to achieve carbonisation and subsequent activation.

15 Claims, 1 Drawing Figure

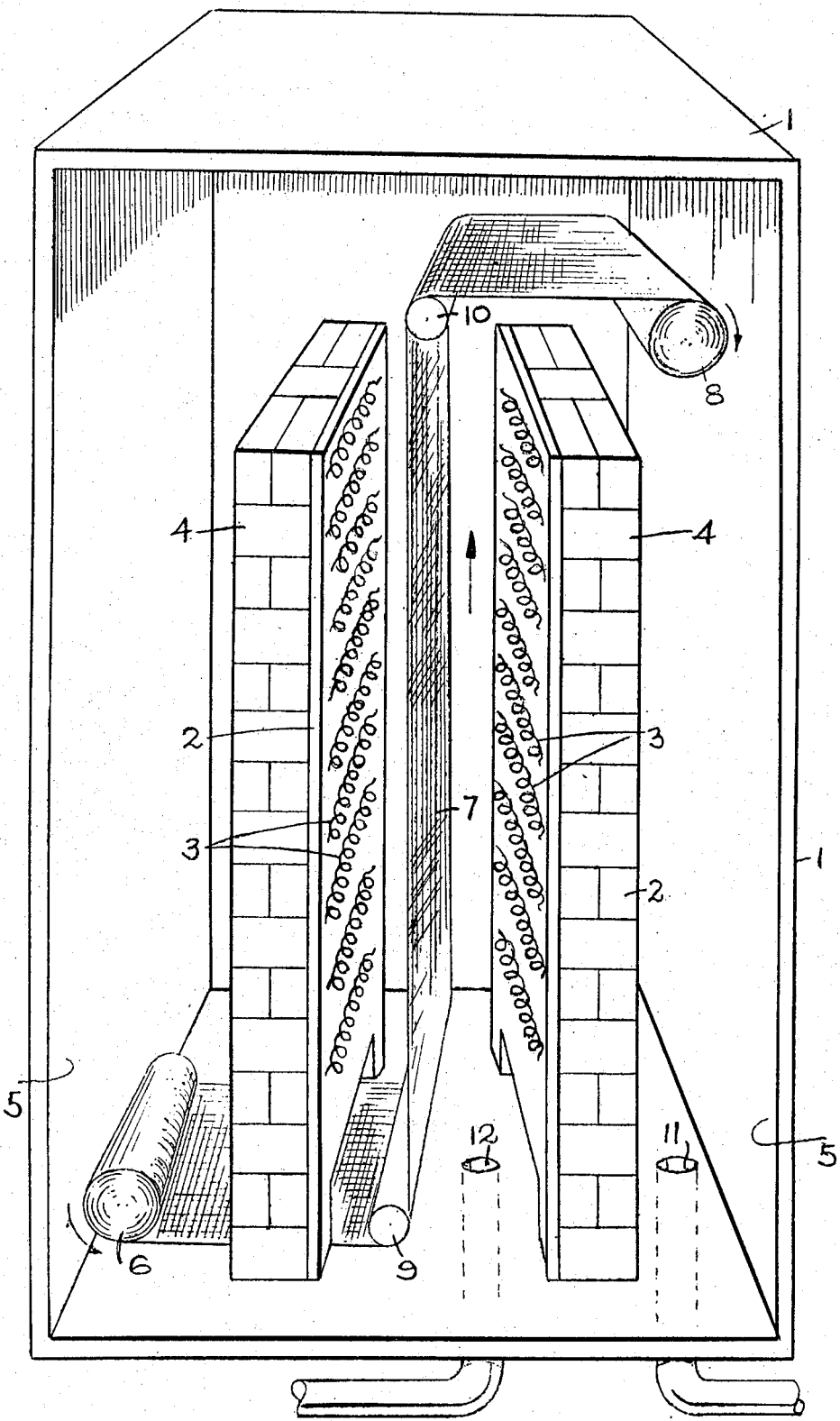

SEQUENTIAL CARBONIZATION AND ACTIVATION OF FIBROUS MATERIAL IN A CARBON DIOXIDE ATMOSPHERE

This application is a continuation-in-part application of Application Ser. No. 1,561, filed Jan. 8, 1970, now abandoned.

The invention relates to a carbonising process and apparatus therefor, and is particularly concerned with the production of materials consisting wholly or predominantly of carbon in an activated state and in fibrous form i.e. in the form of a filament, yarn, thread or tow or as a woven or a non-woven cloth.

Activated carbon in granular, powder and massive form is well-known and has been used widely for, for example, industrial filtration and decolorisation, air filtration in respirators and air-conditioning systems. The potential advantages of an activated carbon in fibrous form particularly as cloth, are manifold if acceptably high absorbency and strength are obtained. For example, compared with a granular filter bed an industrial filter formed of thicknesses of activated carbon cloth offers relatively little obstruction to the transmission of liquid bearing contaminants to be extracted; replacement or regeneration of a saturated filter is simplified; an activated carbon cloth can be self-supporting; and an activated carbon cloth has no serious tendency to pack down and consolidate under vibration with consequent reduction in filtration efficiency.

Hitherto, various attempts to produce useful activated fibrous carbon have met with little success because products have failed to combine flexibility, adequate tensile strength and absorbency. The reasons for this are largely that the steps of carbonising (pyrolysing) a carbonaceous material and activating it necessarily remove a large proportion of the starting material with predictably catastrophic results for thin fibres. Thus, carbonisation of cellulose by conventional means often results in weight losses of around 80 percent and activation of the carbonised material removes a further 70 percent in forming the desired porous active surface.

A very great deal of research and development effort has been expended on the carbonisation of fibrous carbohydrate materials to give non-activated fibrous carbons. Considerably less attention has been paid to the activation of fibrous carbons and effectively combined processes in which activated fibrous carbons are continuously produced from fibrous carbohydrate on an industrial rather than a laboratory scale, have not been described. Naturally, producers of non-activated fibrous carbons have suggested that their products are suitable for activation but can quote only relatively low activities for such final products even when these products have been produced under carefully controlled laboratory conditions (for example, U.S. Pat. No. 3,053,775 suggests 50 percent carbon tetrachloride saturation represents the activity upper limit). We have discovered two factors having a highly significant effect on the effectiveness of fibrous carbon production which have not been properly appreciated previously and which form the basis of improved processes in accordance with the present invention.

Firstly, we find that it is essential to sweep away the tars and other volatile decomposition products produced during the carbonisation of the fibrous carbohydrate so that these decomposition products cannot thereafter deposit upon the carbon fibre. Such deposition results in considerable loss of strength by brittle fracture during subsequent handling and processing stages. This we find may be largely overcome by carbonising in a vertical oven swept with a stream of gas which is inert in the carbonisation reaction and which carries the volatile decomposition products rapidly away from the carbonised fibre. We are aware that U.S. Pat. No. 3,479,151 advocates the use of a purging stream of inert gas during carbonisation, but the stream is taught therein only for the purpose of reducing moisture in the environment caused mainly by the saturation of the starting material with aqueous solutions immediately prior to carbonising. The object of removing this moisture is stated to be equally well achieved — although less conveniently — by maintaining a vacuum around the carbonising material and it is clear that the essentiality of removing harmful decomposition products other than water by a stream of inert gas has not been appreciated.

Secondly, we find that a particular activating gas not previously suggested for activating fibrous carbon, behaves as an inert gas in the temperature range 100°–300°C normally used for carbonisation, but behaves as an activating gas at temperatures above about 800°C. Thus the carbonisation and activation stages may be combined into a single continuous process for the production of flexible active fibrous carbon from a cellulosic fibrous organic, especially cellulosic, starting material within a single vertical furnace in a carbon dioxide atmosphere. In addition, carbon dioxide causes some oxidation of tarry thermal decomposition products to carbon monoxide and water.

According to the invention, an improved carbonising process includes the steps of passing a fibrous organic material upwardly past at least one heating element, heating said fibrous organic material with said heating element firstly to a carbonising temperature to form a carbonised fibrous organic material, subsequently heating said carbonised fibrous organic material with said heating element to an activation temperature to form an activated fibrous carbon, and removing volatile decomposition products produced during said first heating and said subsequent heating with an upward stream of a purging gas selected from the group consisting of carbon dioxide, mixtures of carbon dioxide with at least one inert gas and mixtures of carbon dioxide with at least one hydrogen halide.

Conveniently, the heat applied is increased progressively from the lower part to the upper part of each heating panel so that volatile thermal decomposition products are maintained in the vapour phase by the higher temperatures in the upper regions of the panels and are carried away by the convection currents passing upwardly between the panels.

The purging gas may consist solely of carbon dioxide or may also contain up to 50 percent (v/v) of an inert gas such as nitrogen, argon, helium ammonia or furnace gases or up to 90 percent (v/v), preferably up to 50 percent (v/v) of gases which improve the yield or strength of the carbonised product such as hydrogen halides, especially hydrogen chloride. The purging gas should, however, preferably be substantially free from oxygen since the presence of as little as 0.5 percent of oxygen may result in oxidation and subsequent rupture of the carbon fibres. The current stream of purging gas may result purely from convection effects, but preferably the convective flow should be reinforced to give a total relative gas flow rate over the surface of the material of between about 50 and 250 cm/minute.

The formation of undesirable volatile thermal decomposition products may be markedly reduced or substantially eliminated by incorporating into the fibrous organic starting material to be carbonised at least one impregnant by processes more fully described in our co-pending application Ser. No. 1,557, filed Jan. 8, 1970, now abandoned, and refiled on Feb. 4, 1972 as Ser. No. 223,782. Impregnants whose presence results in an improved carbonisation process are selected from the well-known class of electron acceptor materials which includes the dihalides, particularly the dichlorides, of barium, calcium, magnesium and zinc and the trihalides, particularly the trichlorides of aluminium, chromium and iron.

Calcium chloride and ammonium chloride may also be used as the impregnants but their effects are usually exhibited at higher, and therefore less economic, temperatures in the carbonisation range. Additionally, ammonium chloride is excessively volatile in the carbonisation process and tends to be lost before full benefit can be obtained.

As further described in our co-pending Application Ser. No. 1557, filed Jan. 8, 1970, now abandoned, and refiled on Feb. 4, 1972 as Ser. No. 223,782, certain metal cations increase the rate of activation of the fibrous carbonaceous material if incorporated into the fibrous material either prior to carbonisation or immediately prior to activation. With the use of these additives, activation may be caused to proceed at a temperature in the lower part of the activation range, i.e. about 600°–800°C or at a higher rate at temperatures in the upper part of the range, i.e. 800°–1,000°C. Salts which provide metal cations having these desirable effects on the activation process are the trihalides, particularly the trichlorides of aluminium, iron and cobalt and the dihalides, particularly the dichlorides, of zinc, barium and calcium.

Lead salts, particularly lead nitrate, are observed to have a similar effect on the activation mechanism.

For rapid sorption of gases it is found that an activated fibrous carbon requires to have a considerable number of relatively large (on a molecular scale) pores rather than numerous small pores. This information is not given by the value of specific surface area for the activated material but may be obtained by using the activated material as, in effect, a molecular sieve and measuring the relative heats of wetting respectively of a liquid composed of relatively small molecules such as methanol or a liquid having relatively large molecules such as a liquid silicone. In general, the longer a char is in contact with the activating gas, carbon dioxide, the greater is the loss in weight of the char by the pore-forming activation reaction. At the same time, the average pore size increases with increasing weight loss. Thus for the most active material a high proportion of the origianl char weight should be lost, but generally high weight losses result in large reductions in the tensile strength of the treated fibrous char and considerably reduce the yield of activated product. We have found that the optimum comprise between tensile strength and activity for a carbon cloth is obtained at between about 40–70 percent weight loss during activation and preferably about 60 percent by weight. Where the char to be activated has been impregnated with at least one halide, especially a chloride, of aluminium, zinc or iron, however, equally good compromise properties may be obtained for weight losses of only 20–40 percent and preferably about 30 percent. This increased activity is apparently not due to a modification of the activation mechanism but to a modification of the pore structure of the char during activation. The increased activity obtained in this way is of much practical importance since not only may the duration and temperature of the activation stage be reduced, but the volume activity of the activated cloth is enhanced. Activation energies are generally of the order of 70 Koal/mole and vary with the activating gas and impregnant.

Thus various impregnants advantageously may be used at various stages in the production of active fibrous carbon and it will be evident that combinations of impregnants may be used to combine various advantages. In the process of the present invention, it is clearly preferable to introduce all the desired impregnants into the organic fibrous material prior to its carbonisation. It is generally found that in such cases the optimum combination of advantages may be obtained by using at least one impregnant selected from the group consisting of halides of zinc, aluminium, barium, calcium, magnesium and iron. The impregnants may conveniently be incorporated into the fibrous organic starting material by immersing the material in an aqueous solution containing 1 to 30 percent by weight of the impregnant, and drying and flexing the impregnated material.

The fibrous material to be carbonised may be natural cellulosic fibrous organic material such as cotton, sisal or flax or a pre-oxidised synethetic fibrous material such as a polyamide, polyacrylonitrile or polyvinyl alcohol. However preferred fibrous organic materials for use in the present invention are synthetic fibrous cellulosic materials such as viscose rayon or cuprammonium rayon.

If the fibrous material to be carbonised and activated is in the form of a woven or knitted cloth, the cloth may be passed conveniently through the furnance as a continuous strip, the speed of passage being adjusted to give the appropriate residence time in the furnace. Carbonised or activated cloth is thus continuously produced. The diameter of the fibres used is not critical to the success of the process, but it is found that the smaller the fibre diameter the more flexible in general will be the carbonised product. Typically, fibre diameters of 5–20 microns represent a good compromise between tensile strength and flexibility in the resulting carbonised fibre, and if the fibre is in the form of a woven or knitted cloth the carbon cloth resulting is normally strong and sufficiently flexible to be folded upon itself without cracking.

The strength of a resulting carbon cloth depends to some extent on the weave of the fibrous organic cloth used as starting material. Preferred weaves are those in which the weave is relatively loose allowing considerable relative movement between individual fibres when the cloth is subjected to tension or flexure so that each fibre does not apply an objectionable cutting force to adjacent fibres. A particularly suitable weave is known as stocking knit.

The residence time required to carbonise and activate a given fibre or cloth depends upon many factors including the operating temperature of, and heat flux generated by, the furnace heating panels; the separation between the panels and the material being heated; the thickness of the treated material; the length of panels between which the material passes; and the rate of convective flow of gas or vapour carrying impurity away from the surface of the treated material. The last factor is of prime importance in the activation of the treated material by the carbon dioxide since particularly advantageous results may be obtained when the relative gas flow rate over the material surface is at least 10 and preferably between about 50 and 250 cm/minute. Activating gas flow rates in this range appear to exert a scouring effect upon the treated material which more effectly removes the carbonisation impurities, increases the rate of activation and increases the useful activity of the product by forming a relatively high proportion of larger pores in the activated material which pores are particularly desirable to give rapid sorption.

There is normally no advantage in pre-heating the fibrous organic material and generally the material is directly fed at room temperature between the heating panels. The temperature of the material is raised during its upward progression through furnace so that the material receives an appropriate time in the carbonisation temperature range up to about 600°C and, if desired, in the activation temperature range of 600°–1,000°C. As more fully described in co-pending application Ser. No. 223,782 we have found that when impregnants are used in carbonising processes in accordance with the present invention, there is, within the broad temperature range of 70°–300°C, a crictical temperature range of between 40° and 80°C depending upon the impregnant used, within which the temperature should be maintained for at least 15–20 minutes for a 40°C range, and up to at least 30 minutes for a 80°C range, in order to produce fibrous carbon having relatively high tensile strength without loss of other valuable properties. It has been found particularly advantageous for the material to be held at a constant temperature within the critical range for a period between 15 minutes and 1 hour, particularly as a pause period within a steadily rising temperature programme.

The critical temperature range is around the temperatures at which the material starts to decompose and looses weight most rapidly during the carbonising process.

The temperature at which the bulk of decomposition takes place for a typical rayon cloth impregnated with various impregnants are as follows:

| Impregnant | Approximate decomposition temperature (°C) |
|---|---|
| None | 280 |
| $AlBr_3$ | 80 |
| $AlCl_3$ | 100–180 |
| $ZnCl_2$ | 200–270 |

The means by which the furnace is heated include gas, or oil-fired burners, microwave heaters and the like, but for convenience, case of control, and lack of contamination, electrical resistance heaters of the type commonly used in radiant electrical domestic heaters are preferred. A parallel array of such heaters arranged along the heating face of each panel is readily controlled and with advantage each heater on one panel is connected in parallel to an opposite heater on the other heating panel so that a similar heating effect is applied to each side of the fibrous material passing through furnace. Electrical resistance heaters should be silica-sheathed or otherwise protected where corrosive gases and vapours are expected to be released in the process, e.g., where hydrogen chloride might be produced during the carbonisation of a chloride impregnated fibrous material.

A typical example of a furnace suitable for carrying out an improved carbonising process in accordance with the invention will now be described with reference to the accompanying Drawing which shows diagrammatically a perspective view of the furnace.

The furnace principally comprises an outer casing 1 enclosing a pair of heating panels 2 each extending upwardly from a lower part to an upper part of the casing 1 and having on their heating faces heating elements 3 in opposition so that the heating effect of each panel is directed to the zone between the panels. The panels have each a backing 4 of thermal insulating material and the furnace casing has a lining 5 of similar material.

A supply 6 of fibrous carbonaceous material 7 is passed into the furnace upwardly between the heating panel faces 4. A driven take-up roller 8 collects the treated product. Guide rollers 9 and 10 are provided to align the treated material in the furnace. An exhaust outlet 11 permits the removal of gases and vapours from the furnace and a gas feed inlet 12 allows the furnace to be filled with any desired gaseous atmosphere and if necessary provides a stream of activating gas to pass over the surface of the treated material.

A particular process for the production of a strong activated carbon cloth in a furnace as described with reference to the accompanying drawing is as follows.

An 8 inch wide strip of fibrous carbonaceous material ("Moygashel" woven rayon fabric manufactured by Courtaulds Ltd. having 30 warp fibres per inch and 30 weft fibres per inch composed of 200 (200) Denier fibre) and impregnated with 12 percent by weight zinc chloride and subsequently dried and flexed was passed between furnace heating panels each consisting of an 18 inch high bank of 18 1-kilowatt resistance heating elements (1 foot long and 2 inches wide) regularly spaced and mounted on a ceramic supports. The separation between the heating panels was 1½ inches and the rate of passage of the material through the furnace was approximately 7½ inches per hour. The temperature measured at the surface of the material increased progressively at an approximate rate of 4°C/min from room temperature at the furnace inlet to full carbonisation temperatures between about 300° and 600°C after between 9 and 15 inches of travel past the heating panels and to activation temperatures of about 750°C during the final 3 inches of travel past the panels. A stream of carbon dioxide gas was passed continuously into the furnace at a rate of 10 litres/minute and was drawn by convection currents upwardly between the heating panels given a securing flow rate of about 100 cm/minute over the cloth surface thus carrying upwards the volatile matter released from the cloth and reacting with the cloth to activate it in its final stage of travel through the furnace. The strong activated carbon cloth continuously emerging from the furnace had a tensile strength of 4 kg/cm in the warp direction, a specific area of 1,200 m$^2$/g ($N_2$, B.E.T.), a heat of wetting of 14 cal/g (with silicone fluid 2 cs) and 28 cal/g (with benzene). The approximate strength of average carbon filament forming the cloth may be calculated to be approximately 40,000 pounds per square inch.

Modifications and variations of the processes and apparatus described are possible without departing from the spirit of the invention and will be apparent to those skilled in the art.

We claim:

1. A process for the manufacture of highly activated fibrous carbon comprising passing a body of a fibrous organic material in a continuous length upwardly past at least one heating element thereby subjecting the said fibrous material to a heating program comprising firstly a carbonizing stage to carbonize the organic fibrous material and subsequently an activating stage to activate the carbonized fibrous material and throughout both stages of said heating program exposing the fibrous material to an upward stream of a purging gas to remove volatile decomposition products and activate the carbonized fibrous material, said purging gas being selected from the group consisting of carbon dioxide, mixtures of carbon dioxide with ammonia, mixtures of carbon dioxide with up to 50 percent (V/V) of at least one inert gas and mixtures of carbon dioxide with at least one hydrogen halide; wherein the rate of upward passage of said fibrous organic material relative to the heating element gives a residence time of at least 15 minutes in the critical temperature range of between 40° and 80°C around the temperature at which the material starts to decompose and lose weight most rapidly during the carbonization process; and wherein the convective gas flow upwardly between said fibrous organic material and said heating element is reinforced by a supply of said purge gas to give a total relative gas flow rate over the surface of the material between 10 and 250 cm./minute.

2. A process according to claim 1 wherein the convective gas flow upwardly between said fibrous organic material and said heating element is reinforced by a supply of said purge gas gas to give a total relative gas flow rate over the surface of the material of between 50 and 250 cm/minute.

3. A process according to claim 1 wherein the inert gas is selected from the group consisting of nitrogen, argon, helium and furnace gases.

4. A process according to claim 1 wherein the purging gas is a mixture of carbon dioxide with up to 90 percent by volume of hydrogen halide.

5. A process according to claim 4 wherein the purging gas contains up to 50 percent by volume of the hydrogen halide.

6. A process according to claim 5 wherein the hydrogen halide is hydrogen chloride.

7. A process according to claim 1 wherein the fibrous organic material is a fibrous carbohydrate material.

8. A process according to claim 7 wherein the fibrous organic material is a fibrous cellulosic material.

9. A process according to claim 8 wherein the fibrous cellulosic material is a regenerated cellulosic material.

10. A process according to claim 9 wherein the regenerated cellulosic material is selected from the group consisting of viscose rayon and cuprammonium rayon.

11. A process according to claim 1, wherein the fibrous organic material is a pre-oxidised synthetic fibrous material selected from the group consisting of polyamides, polyacrylonitrile and polyvinyl alcohol.

12. A process according to claim 7 wherein between about 0.1 and 10 percent by weight of at least one impregnant selected from the group consisting of halides of zinc, aluminium, barium, calcium, magnesium and iron, is incorporated into the fibrous carbohydrate material before it is carbonised.

13. A process according to claim 12 wherein the impregnant is a chloride.

14. A process according to claim 12 wherein the impregnant is incorporated into the fibrous carbohydrate material by immersing the fibrous carbohydrate material in an aqueous solution containing 1 to 30 percent by weight of the impregnant.

15. A process according to claim 1 wherein the fibrous organic material is in the form of woven or nonwoven cloth.

* * * * *